(12) United States Patent
Middleton (10) Patent No.: US 12,295,379 B2
(45) Date of Patent: *May 13, 2025

(54) SMOKER

(71) Applicant: MIDDLETON MIXOLOGY LLC, Chehalis, WA (US)

(72) Inventor: James Dean Middleton, Chehalis, WA (US)

(73) Assignee: MIDDLETON MIXOLOGY LLC, Chehalis, WA (US)

( * ) Notice: Subject to any disclaimer, the term of this patent is extended or adjusted under 35 U.S.C. 154(b) by 912 days.

This patent is subject to a terminal disclaimer.

(21) Appl. No.: 17/162,822

(22) Filed: Jan. 29, 2021

(65) Prior Publication Data

US 2021/0227842 A1 Jul. 29, 2021

Related U.S. Application Data

(60) Provisional application No. 62/967,081, filed on Jan. 29, 2020.

(51) Int. Cl.
*A23B 4/052* (2006.01)
*A21B 1/28* (2006.01)
(Continued)

(52) U.S. Cl.
CPC ............ *A23B 4/052* (2013.01); *A21B 1/28* (2013.01); *F23B 7/002* (2013.01); *A23V 2002/00* (2013.01); *C12G 3/07* (2019.02)

(58) Field of Classification Search
CPC ............ A47J 37/0786; A47J 37/0704; A47J 37/0713; A47J 37/0727; A47J 37/0754;
(Continued)

(56) References Cited

U.S. PATENT DOCUMENTS 11,744,256 B2 9/2023 Sumner
11,932,835 B2 3/2024 Oliver
(Continued)

FOREIGN PATENT DOCUMENTS

ES 1184909 U 6/2017

OTHER PUBLICATIONS

Extended European Search Report dated May 31, 2021 in corresponding European Application No. 21154427.5, 6 pages.
(Continued)

*Primary Examiner* — Phuong T Nguyen
(74) *Attorney, Agent, or Firm* — MH2 TECHNOLOGY LAW GROUP LLP (57) ABSTRACT

A smoker configured to infuse smoke into flavor and/or taste of a beverage or food includes a body member having a through bore extending from a first end of the body member to an opposite second end of the body member in a first direction and an insert configured to be received in the through bore at the first end and retained by the through bore at a position between the first end and the second end. The through bore and the insert are configured to define a chamber for receiving a combustible material between the insert and the first end, the through bore is configured to permit a flow of smoke from the combustible material out the through bore at the second end of the body member, and the second end of the body member is configured to rest on a rim of a container to block the flow of air from the container where a surface of the second end of the body member contacts the rim.

28 Claims, 4 Drawing Sheets

(51) Int. Cl.
*F23B 30/00* (2006.01)
*C12G 3/07* (2006.01)

(58) Field of Classification Search
CPC .. A47J 37/0623; A47J 37/067; A47J 37/0763; A47J 27/01; A47J 27/06; A47J 27/04; A47J 2027/043; A23B 4/052; A21B 1/28; F23B 7/002; C12G 3/07; A23V 2002/00
USPC ......... 99/331, 339, 347, 401, 467, 468, 472, 99/474, 476, 482
See application file for complete search history.

(56) References Cited

U.S. PATENT DOCUMENTS

| | | |
|---|---|---|
| 2019/0320712 A1 | 10/2019 | Rix et al. |
| 2019/0364960 A1* | 12/2019 | Nguyen .................. A24F 1/30 |
| 2019/0387789 A1 | 12/2019 | Mehio |
| 2023/0255218 A1 | 8/2023 | Pla Cortes |

OTHER PUBLICATIONS

"Exhibit 10," Instagram, May 10, 2019, Jun. 20, 2019 and Jun. 27, 2019, Case: 1:24-cv-12287 Document #: 59-11 Filed Feb. 4, 2025, pp. 859-864 [retrieved on Feb. 3, 2025]. Retrieved from the Internet: <URL:https://www.instagram.com/oscar_luzon/p/BxSVIOKIQg6/>; <URL:https://www.instagram.com/p/By8WSpfnt39/>; and <URL:https://www.instagram.com/p/BzNzATUo_yb/>.

* cited by examiner

SMOKER

CROSS-REFERENCE TO RELATED APPLICATION

This application claims the benefit of U.S. Provisional Application No. 62/967,081, filed Jan. 29, 2020, pending, the disclosure of which is hereby incorporated by reference herein in its entirety.

BACKGROUND

Adding smoke to a cocktail or food adds a layer of complexity to the flavor and/or aroma of the cocktail or food. When smoke is introduced into a cocktail glass or other container, the smoke comes in contact with the glass and contents (e.g., ice and liquid) of the glass. The molecules in the smoke, except for the tar and carbon particles, dissolve in moisture on the glass and contents, thereby imparting the smell and taste of the smoke to the eventual cocktail. For example, the film of water on the surface of an ice cube attracts and bonds to the smoke. The smoke will then infuse the cocktail giving it a smoky flavor with real smoke.

A conventional type of smoker comprises a glass dome or enclosed smokebox that will hold smoke introduced from a handheld smoke generator, for example, a smoke gun. The smoke generator typically includes a chamber for receiving wood chips and shavings. The smoke generator can be powered by electric current to create heat sufficient to burn the wood chips, thereby generating smoke. The smoke is typically directed onto the food or drink, and the glass dome is placed over the smoke and food/drink to allow the smoke to infuse into the food or drink.

Another conventional type of smoker comprises a wood plank that can be positioned adjacent a drink or food. The wood plank is lit on fire with a lighter, and a glass cover is placed over the burning section of the wood plank with the lip of the cover facing downward so that the cover collects the smoke for infusing the drink or food.

However, the aforementioned conventional smokers have a number of disadvantages. For example, they occupy a significant amount of space, which is undesirable in a kitchen or bar. They also require multiple parts to be moved, which could lead to the loss of smoke. Also, electric smokers require batteries. The conventional smokers infuse an area and the smoke is only indirectly received by the drink or food, which imparts less flavor and aroma to the drink or food.

Accordingly, it may be desirable to provide a smoker that overcomes one or more of the above disadvantages of conventional smokers.

SUMMARY

According to various aspects of the disclosure, a smoker configured to infuse smoke into flavor and/or taste of a beverage or food includes a body member having a through bore extending from a first end of the body member to an opposite second end of the body member in a first direction and an insert configured to be received in the through bore at the first end and retained by the through bore at a position between the first end and the second end. The through bore and the insert are configured to define a chamber for receiving a combustible material between the insert and the first end, the through bore is configured to permit a flow of smoke from the combustible material out the through bore at the second end of the body member, and the second end of the body member is configured to rest on a rim of a container to block the flow of air from the container where a surface of the second end of the body member contacts the rim.

In some aspects of the aforementioned smoker, the through bore includes a first bore portion adjacent the first end of the body member and a second bore portion adjacent the second end of the body member, and the first bore portion has an inside diameter that is greater than an inside diameter of the second bore portion.

In various aspects of the aforementioned smokers, an interface of the first bore portion and the second bore portion defines a shoulder configured to retain the insert in the first bore portion.

In some aspects of the aforementioned smokers, the inside diameter of the second bore portion is smaller than an outside diameter of the insert such that the second bore portion is configured to prevent the mesh insert from passing into the second bore portion.

In various aspects of the aforementioned smokers, the body member includes a groove in the surface of the second end, and the groove extends in a second direction perpendicular to the first direction of the through bore from an outer periphery of the second end to a position spaced from the through bore.

In some aspects of the aforementioned smokers the body member includes two grooves in the surface of the second end, and the grooves extend in a second direction perpendicular to the first direction of the through bore from an outer periphery of the second end to positions spaced from the through bore.

In various aspects of the aforementioned smokers, the second end of the body member is sized and configured to be placed on the rim of the container such that each groove crosses the rim of the container to permit air to flow from inside the container to outside the container via each groove.

In some aspects, the aforementioned smoker may further include a cylinder configured to be inserted into the through bore at a first end of the body member, wherein the cylinder is configured to receive the insert such that the insert and the cylinder define a chamber in the through bore adjacent the first end of the body member. In various aspects, the smoker further comprises a washer configured to slidingly receive the cylinder and to abut the first end of the body member. In some aspects, the cylinder includes a lip configured to engage the washer and prevent the cylinder from sliding completely through the washer.

In various aspects of the aforementioned smokers, the through bore includes a first bore portion adjacent the first end of the body member and a second bore portion adjacent the second end of the body member, the first bore portion has an inside diameter that is greater than an inside diameter of the second bore portion such that the cylinder is configured to be disposed in the first bore portion, and the second bore portion is configured to prevent the cylinder from entering the second bore portion.

In some aspects of the aforementioned smokers, the inside diameter of the second bore portion is smaller than an outside diameter of the insert such that the second bore portion is configured to prevent the mesh insert from passing into the second bore portion.

In various aspects of the aforementioned smokers, the body member includes a groove in a surface of the first end that insects with an exit through bore extending from the first end of the body member to the second end of the body member in the first direction, and the groove extends in a second direction perpendicular to the first direction of the exit through bore from the exit through bore to an outer periphery of the first end of the body member.

In some aspects of the aforementioned smokers, the body member includes two grooves in a surface of the first end and two exit through bore extending from the first end of the body member to the second end of the body member in the first direction, and each of the grooves intersects with a respective one of the exit through bores and extends in a second direction perpendicular to the first direction from the respective exit through bore to an outer periphery of the first end of the body member.

In various aspects, any of the preceding smokers may further include a lid configured to be placed on a surface of the first end of the body member to cover the through bore so as to block the flow of air from the container via the through bore.

BRIEF DESCRIPTION OF THE DRAWINGS

Features and advantages of the present disclosure are described in, and will be apparent from, the following Brief Description of the Drawings and Detailed Description.

DETAILED DESCRIPTION OF EMBODIMENTS

As a preface to the detailed description, it should be noted that, as used in this specification and the appended claims, the singular forms "a," "an," and "the" include plural referents, unless the context clearly dictates otherwise.

Referring to the drawings, FIGS. 1-4 depict an exemplary embodiment of a smoker 100 in accordance with various aspects of the disclosure. The smoker 100 includes a body member 110 and a mesh insert 150. The body member 110 includes a base portion 112 and a top portion 114. In various aspects, the body member 110 is a monolithic structure of unitary construction. In some aspects, the base portion 112 and the top portion 114 can be separate structures that are secured together via any conventional means. The body member 110 may be wood or any food grade material that can withstand the heat generated by, for example, a torch lighter that is used to burn wood chips stored in a chamber of the top portion 114 and ignited by the torch lighter, as discussed in more detail below.

Figure 4:
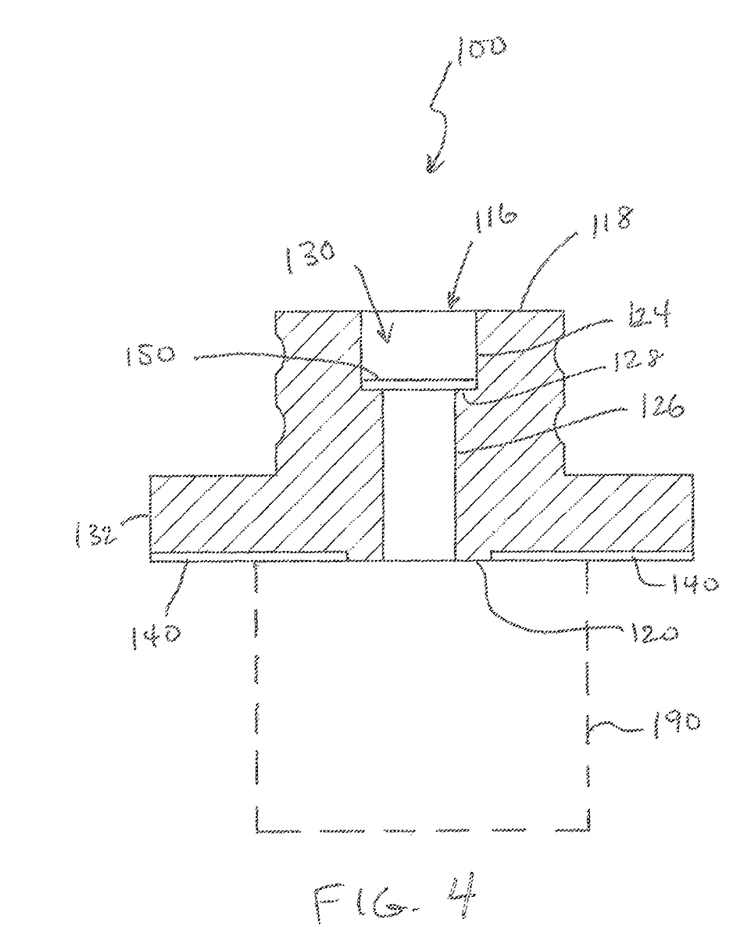
FIG. 4 is a side cross-sectional view of the smoker of FIG. 1 taken along A-A of FIG. 3.

As shown in FIG. 4, the body member 110 includes a through bore 116 extending from a top surface 118 of the top portion 114 to a bottom surface 120 of the base portion 112. The through bore 116 has a first bore portion 124 extending from the top surface 118 into the top portion 114, and a second bore portion 126 extending from the first bore portion 124 to the bottom surface 120. The first bore portion 124 has an inside diameter that is greater than an inside diameter of the second bore portion 126, thus defining a shoulder or shelf 128 at the interface of the first bore portion 124 and the second bore portion 126.

The first bore portion 124 is sized such that the mesh insert 150 can be received in the first bore portion 124, and the second bore portion 126 is sized such that the mesh insert cannot be inserted into the second bore portion 126. As illustrated, the mesh insert 150 is configured to be disposed above the shoulder 128. The mesh insert 150 and the first bore portion 124 define a chamber 130 configured to received wood chips, wood shaving, or other combustible material. The mesh insert 150 may be stainless steel or any food grade material that can withstand the heat generated by, for example, a torch lighter that is used to burn wood chips stored in a chamber of the top portion 114 and ignited by the torch lighter.

Figure 1:
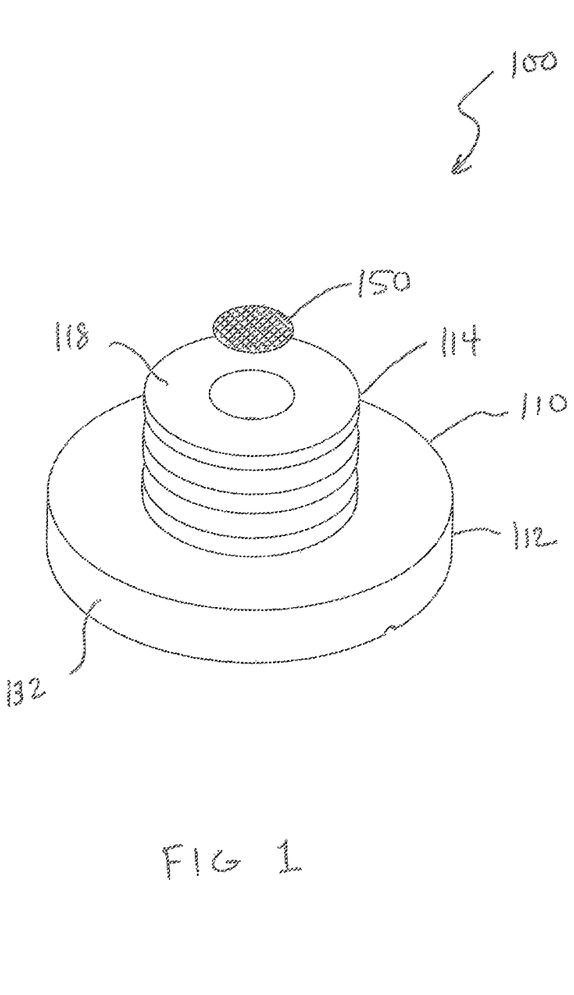
FIG. 1 is an exploded top, front perspective view of an exemplary smoker in accordance with various aspects of the disclosure.
Figure 2:
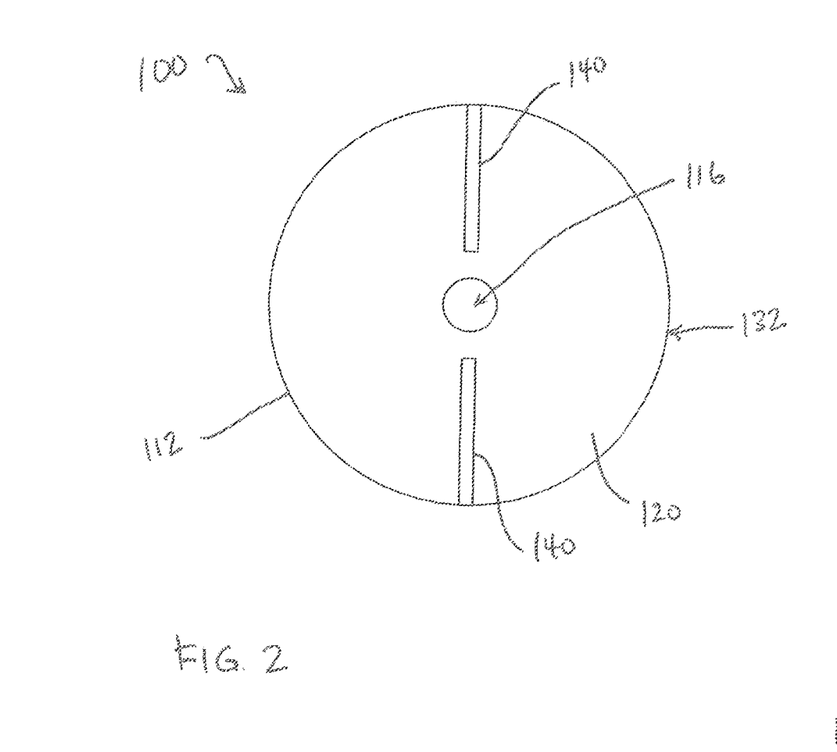
FIG. 2 is a bottom view of the smoker of FIG. 1.
Figure 3:
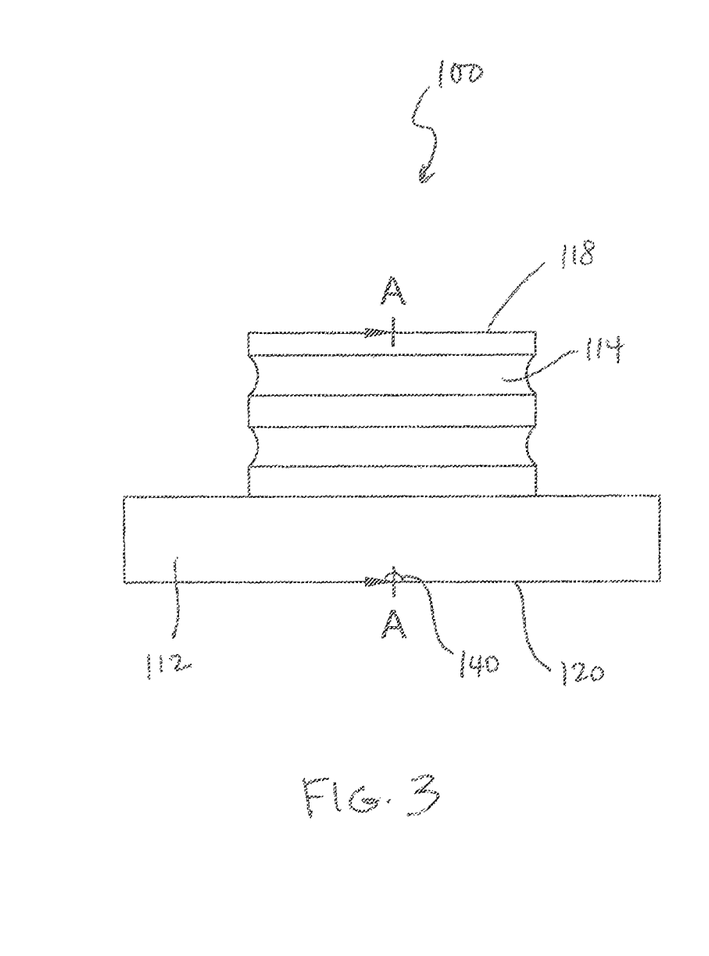
FIG. 3 is a side view of the smoker of FIG. 1.

The bottom surface 120 of the base portion 112 is flat and includes two grooves 140 that extend from an outer wall 132 of the base portion 112 inward toward the second bore portion 126. However, the grooves 140 end short of the second bore portion 126 such that the grooves 140 do not fluidly communicate with the second bore portion 126. As illustrated, the outer wall 132 of the base portion 112 is circular and the grooves 140 extend radially inward.

As shown in FIG. 4, the base portion 112 is sized and configured such that the bottom surface 120 sits on the rim of a container 190 such as, for example, a cocktail glass, a plastic container or cup, a glass jar or bottle, or the like. The rim of the container 190 should be sized larger than the diameter of the opening of the second bore portion 126 and smaller than the diameter of the outer wall 132 of the base portion 112 such that the second bore portion 126 and the grooves 140 fluidly communicate with the interior volume of the container 190. Otherwise, the bottom surface 120 cooperates with the rim of the container 190 to provide a barrier to smoke or air exiting the container 190.

It should be appreciated that the smoker 100 may optionally include a lid or topper such as the lid or topper 280 illustrated in FIGS. 5-8. The lid may be wood or any food grade material that can withstand the heat generated by, for example, a torch lighter that is used to burn wood chips stored in a chamber of the top portion 114 and ignited by the torch lighter. The optional lid is configured to be placed on the top surface 118 of the top portion 114 of the body member 110 to cover the through bore 116 so as to (i) extinguish burning wood chips, shavings, or combustible material in the chamber 130, (ii) block the flow of air from the container 190 via the through bore 116, and (iii) keep smoke in the container 190.

In use, when wood chips, shavings, or other combustible material (not shown) are placed in the chamber 130 on the mesh insert 150 and burned with a lighter (not shown), for example, a torch lighter, the smoker 100 permits smoke generated by the burning wood chips, shaving, or other combustible material to travel through the second bore portion 126 and out of the base portion 112 into the container 190. Meanwhile, the grooves 140 permit air in the container 190 to be displaced by the smoke and exit the container 190 via the grooves 140, thereby equalizing the air pressure in the container 190 with the air pressure outside of the container 190. The smoke entering the container 190 comes into contact with the walls of the container 190 and the contents (e.g., ice and/or liquid) of the container 190. The molecules in the smoke dissolve in moisture on the container 190 and its contents, thereby imparting the smell and taste of the smoke to the beverage or food being served in the container 190.

Referring now to FIGS. 5-8, another an exemplary embodiment of a smoker 200 in accordance with various aspects of the disclosure is illustrated. The smoker 200 includes a body member 210, a mesh insert 250, a washer 260, and a cylinder 270. Optionally, the smoker 200 may include a lid or topper 280. The body member 210 includes a base portion 212 and a top portion 214. In various aspects, the body member 210 is a monolithic structure of unitary construction. The body member 210 may be wood or any food grade material that can withstand the heat generated by, for example, a torch lighter that is used to burn wood chips stored in a chamber of the top portion 214 and ignited by the torch lighter, as discussed in more detail below.

Figure 8:
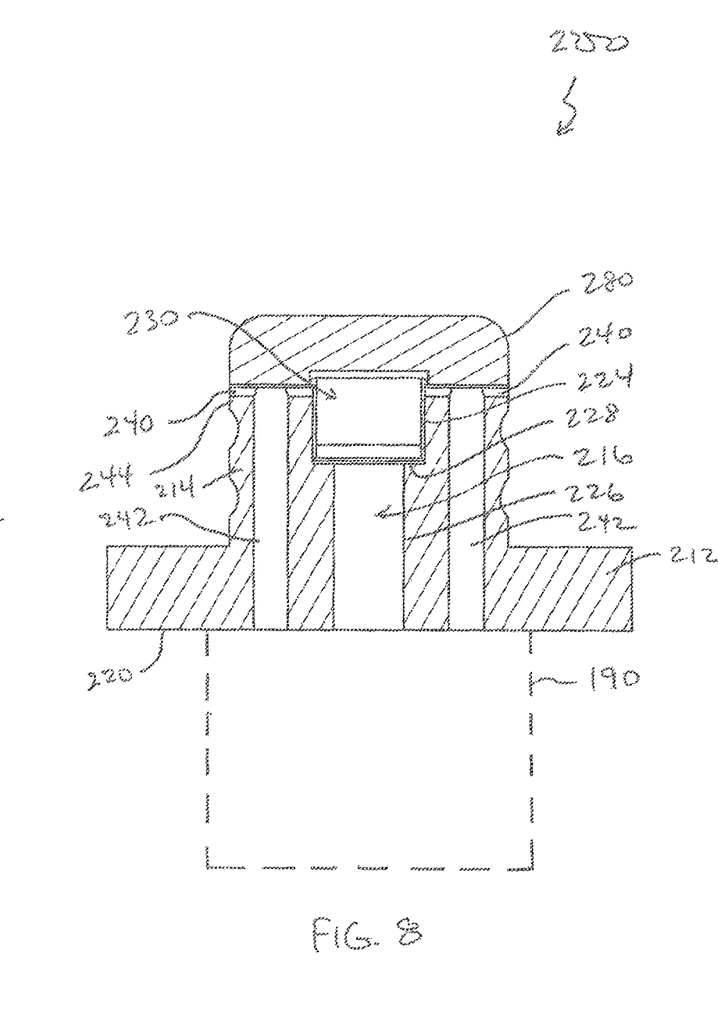
FIG. 8 is a side cross-sectional view of the smoker of FIG. 5 taken along B-B of FIG. 7.

As shown in FIG. 8, the body member 210 includes a through bore 216 extending from a top surface 218 of the top portion 214 to a bottom surface 220 of the base portion 212. The through bore 216 has a first bore portion 224 extending from the top surface 218 into the top portion 214, and a second bore portion 226 extending from the first bore portion 224 to the bottom surface 220. The first bore portion 224 has an inside diameter that is greater than an inside diameter of the second bore portion 226, thus defining a shoulder or shelf 228 at the interface of the first bore portion 224 and the second bore portion 226.

Figure 5:
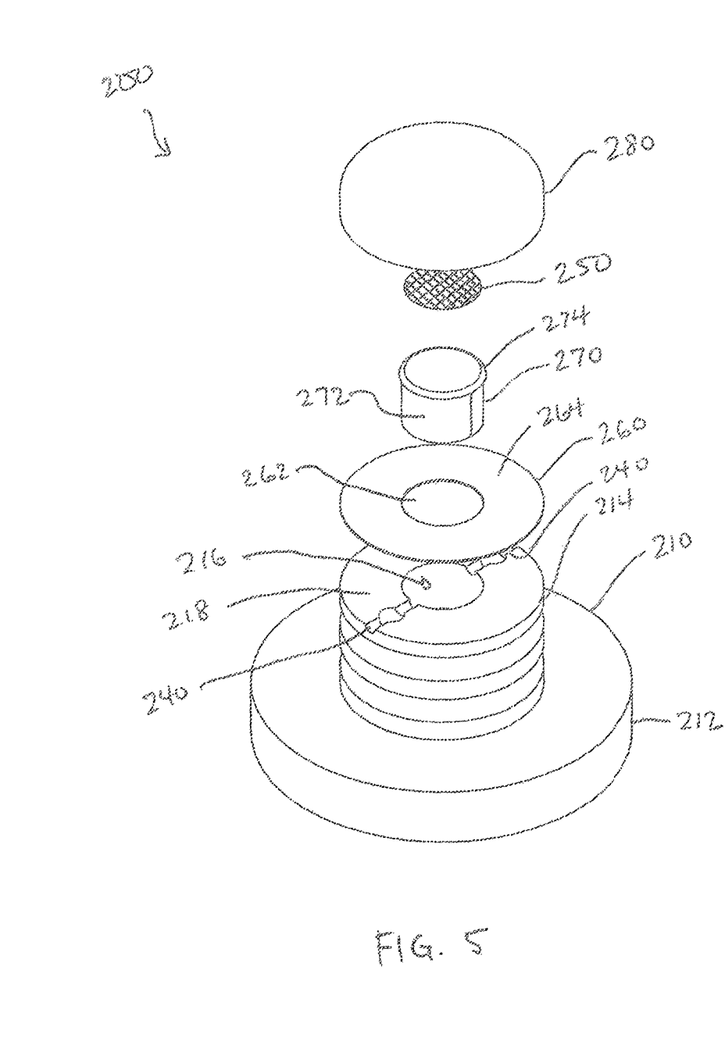
FIG. 5 is an exploded top, front perspective view of another exemplary smoker in accordance with various aspects of the disclosure.

The top surface 218 of the top portion 214 is flat and includes two grooves 240 that extend radially outward from the first bore portion 224 to the outer wall 244 of the top portion 214. As illustrated, the outer wall 244 of the top portion 114 is circular at the top surface 218, and the grooves 240 extend radially. The body member 210 includes exit through bores 242 extending from the top surface 218 of the top portion 214 to the bottom surface 220 of the base portion 212. The exit through bores 242 are radially offset from the through bore 216 in diametrically opposite directions.

Figure 6:
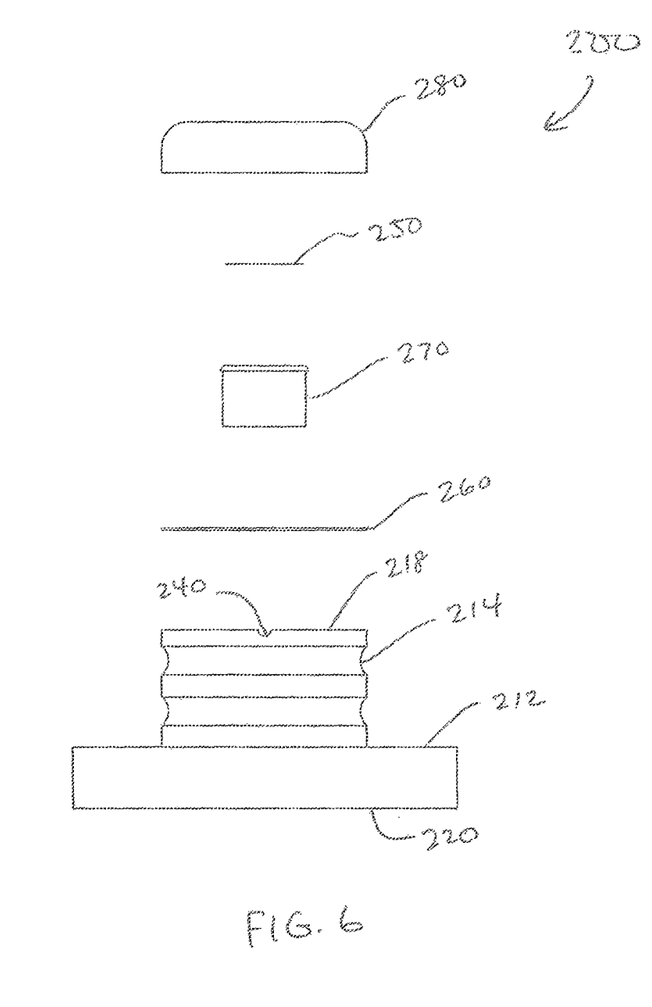
FIG. 6 is an exploded side view of the smoker of FIG. 5.
Figure 7:
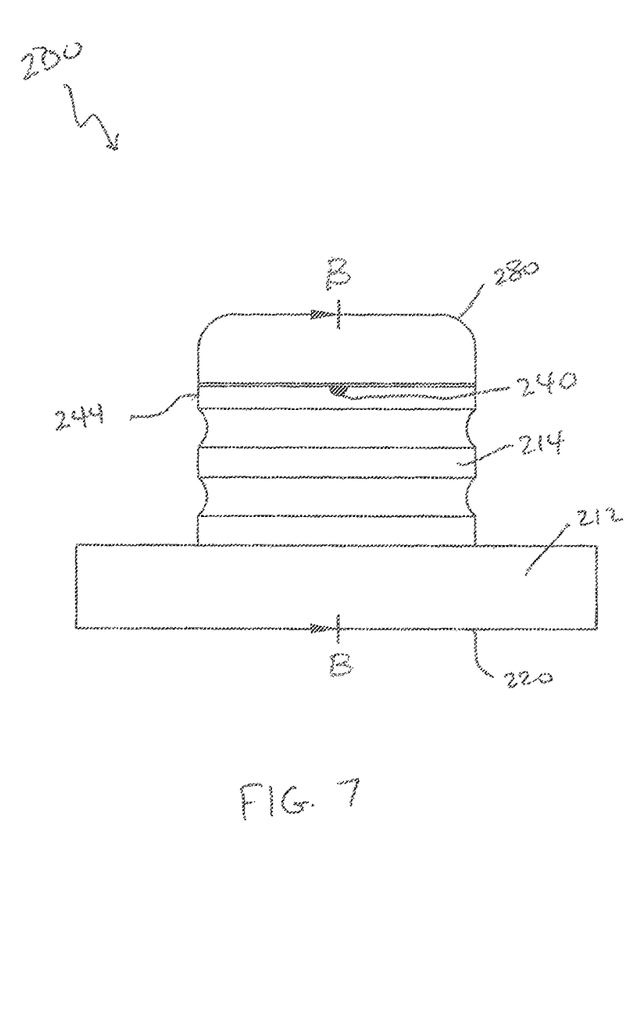
FIG. 7 is a side view of the smoker of FIG. 5.

The first bore portion 224 is sized such that the cylinder 270, for example, a stainless steel cylinder, can be received in the first bore portion 224. The cylinder 270 may include a knurled outer surface 272 for gripping the interior wall of the first bore portion 224 in a friction fit relationship. The washer 260, for example, a stainless steel washer, is sized to match the top surface 218 of the top portion 214. The washer 260 includes a center opening 262 sized to permit the cylinder 270 be inserted into the washer 260. The cylinder 270 includes a lip 274 at a top end that prevents the cylinder 270 from being inserted completely through the washer 260. Instead, the cylinder 270 is configured to be inserted into the washer 260 until the lip 274 meets a top surface 264 of the washer 260.

The cylinder 270 has an inside diameter sized such that the mesh insert 250 can be inserted into the cylinder 270. The bottom end of the cylinder 270 may include a radially inward lip that provides a shoulder or shelf (not shown) upon which the mesh insert 250 can rest. The second bore portion 226 is sized such that the mesh insert 250 cannot be inserted into the second bore portion 226 in the event that the mesh insert 250 is inadvertently pushed through the cylinder 270. The mesh insert 250 and the cylinder 270 define a chamber 230 configured to received wood chips, wood shaving, or other combustible material. The mesh insert 250 may be stainless steel or any food grade material that can withstand the heat generated by, for example, a torch lighter that is used to burn wood chips stored in a chamber of the top portion 214 and ignited by the torch lighter.

As shown in FIG. 8, the base portion 212 is sized and configured such that the bottom surface 220 sits on the rim of a container 190 such as, for example, a cocktail glass, a plastic container or cup, a glass jar or bottle, or the like. The rim of the container 190 should be sized larger than the distance between the radially outer surfaces of the exit through bores 242 such that the second bore portion 126 and the exit through bores 242 fluidly communicate with the interior volume of the container 190. Otherwise, the bottom surface 220 is flat and configured to cooperate with the rim of the container 190 to provide a barrier to smoke or air exiting the container 190.

In use, when wood chips, shavings, or other combustible material (not shown) are placed in the chamber 230 on the mesh insert 250 and burned with a lighter (not shown), for example, a torch lighter, the smoker 200 permits smoke generated by the burning wood chips, shaving, or other combustible material to travel through the second bore portion 226 and out of the base portion 212 into the container 290. Meanwhile, the exit through bores 242 permit air in the container 290 to be displaced by the smoke and exit the container 190 via the through bores 242, thereby equalizing the air pressure in the container 190 with the air pressure outside of the container 190. The smoke entering the container 190 comes into contact with the walls of the container 190 and the contents (e.g., ice and/or liquid) of the container 190. The molecules in the smoke dissolve in moisture on the container 190 and its contents, thereby imparting the smell and taste of the smoke to the beverage or food being served in the container 190.

The optional lid 280 may be wood or any food grade material that can withstand the heat generated by, for example, a torch lighter that is used to burn wood chips stored in a chamber of the top portion 214 and ignited by the torch lighter. The optional lid 280 is configured to be placed on the top surface 218 of the top portion 214 of the body member 210 to cover the through bore 216 so as to (i) extinguish burning wood chips, shavings, or combustible material in the chamber 230, (ii) block the flow of air from the container 190 via the through bore 216, and (iii) keep smoke in the container 190.

It should be appreciated that the smoker 200 may include a through bore 216 having first and second bore portions 224, 226 having the same diameter, and the cylinder 270 can be configured to prevent the insert 250 from moving into the second bore portion 226. Similarly, the smoker 100 may include a through bore 116 having first and second bore portions 124, 126 having the same diameter, and the through bore 116 may include a radial ridge or other structure configured to prevent the insert 150 from moving into the second bore portion 126.

The accompanying figures illustrate various exemplary embodiments of smokers in accordance with the disclosure. Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

What is claimed is:

1. A smoker for infusing smoke into flavor or taste of a beverage or food, the smoker comprising:
   a body member having a through bore extending from a first end of the body member to an opposite second end of the body member in a first direction; and
   wherein the through bore has opposing open ends along a longitudinal axis, wherein the through bore is configured to receive an insert via the first end and retain the insert between the first end and the second end, wherein the through bore is configured to cooperate with the insert are configured to define a chamber for receiving a combustible material between the insert and the first end, wherein the through bore is configured to permit a flow of smoke from the combustible material out the through bore at the second end of the body member, and wherein the second end of the body member is configured to rest on a surface of a container to block the flow of air from the container where a surface of the second end of the body member contacts the surface of the container.

2. The smoker of claim 1, wherein the through bore includes a first bore portion adjacent the first end of the body member and a second bore portion adjacent the second end of the body member, and wherein the first bore portion has an inside diameter that is greater than an inside diameter of the second bore portion.

3. The smoker of claim 2, wherein an interface of the first bore portion and the second bore portion defines a shoulder configured to retain the insert in the first bore portion.

4. The smoker of claim 2, wherein the inside diameter of the second bore portion is smaller than an outside diameter of the insert such that the second bore portion is configured to prevent the insert from passing into the second bore portion.

5. The smoker of claim 1, wherein the body member includes a groove in the surface of the second end, and wherein the groove extends in a second direction perpendicular to the first direction of the through bore from an outer periphery of the second end to a position spaced from the through bore.

6. The smoker of claim 5, wherein the second end of the body member is sized and configured to be placed on the rim of the container such that the groove crosses the rim of the container to permit air to flow from inside the container to outside the container via the groove.

7. The smoker of claim 1, wherein the body member includes two grooves in the surface of the second end, and wherein the grooves extend in a second direction perpendicular to the first direction of the through bore from an outer periphery of the second end to positions spaced from the through bore.

8. The smoker of claim 7, wherein the second end of the body member is sized and configured to be placed on the rim of the container such that the grooves cross the rim of the container to permit air to flow from inside the container to outside the container via the grooves.

9. The smoker of claim 8, wherein the through bore includes a first bore portion adjacent the first end of the body member and a second bore portion adjacent the second end of the body member, wherein the first bore portion has an inside diameter that is greater than an inside diameter of the second bore portion such that the cylinder is configured to be disposed in the first bore portion, and wherein the second bore portion is configured to prevent the cylinder from entering the second bore portion.

10. The smoker of claim 9, wherein the inside diameter of the second bore portion is smaller than an outside diameter of the insert such that the second bore portion is configured to prevent the insert from passing into the second bore portion.

11. The smoker of claim 8, wherein the body member includes a groove in a surface of the first end that insects with an exit through bore extending from the first end of the body member to the second end of the body member in the first direction, and wherein the groove extends in a second direction perpendicular to the first direction of the exit through bore from the exit through bore to an outer periphery of the first end of the body member.

12. The smoker of claim 1, further comprising a cylinder configured to be inserted into the through bore at a first end of the body member, the cylinder being configured to receive the insert such that the insert and the cylinder define a chamber in the through bore adjacent the first end of the body member.

13. The smoker of claim 1, further comprising a lid configured to be placed on a surface of the first end of the body member to cover the through bore so as to block the flow of air from the container via the through bore.

14. The smoker of claim 12, wherein the body member includes two grooves in a surface of the first end and two exit through bores extending from the first end of the body member to the second end of the body member in the first direction, wherein each of the grooves intersects with a respective one of the exit through bores and extends in a second direction perpendicular to the first direction from the respective exit through bore to an outer periphery of the first end of the body member.

15. The smoker of claim 12, further comprising a washer configured to slidingly receive the cylinder and to abut the first end of the body member.

16. The smoker of claim 15, wherein the cylinder includes a lip configured to engage the washer and prevent the cylinder from sliding completely through the washer.

17. The smoker of claim 12, further comprising a lid configured to be placed on a surface of the first end of the body member to cover the through bore so as to block the flow of air from the container via the through bore.

18. A smoker for infusing smoke into flavor or taste into a beverage or food, the smoker comprising:
a body member having a first bore extending from an end of a first portion of the body member to an opposite second portion of the body member in a first direction and a second bore extending from an end of the second portion to the first portion in the first direction; and
an insert configured to permit smoke to pass therethough, wherein the first bore is configured to retain the insert at a position between an end of the first portion and the second portion,
wherein the first bore and the insert are configured to define a chamber for receiving a combustible material between the insert and the end of the first portion,
wherein the first bore is configured to permit a flow of smoke from the combustible material out of the bore of the body member,
wherein the second portion of the body member is configured to rest against a container such that the flow of smoke from the first bore is permitted to enter the container,
wherein the second portion of the body is configured to rest against the container so as to block a flow of air from the container where a surface of the second end portion of the body member contacts the container, and
wherein the second bore is configured to permit the flow of air from the container to an exterior of the container.

19. The smoker of claim 18, wherein the body member includes a groove portion in the surface of the second end portion, and wherein the groove portion extends in a second direction perpendicular to the first direction of the through bore from an outer periphery of the second end portion, and
wherein the groove portion is configured to cross a surface of the container so as to provide a portion of the second end portion of the body member that avoids contact with the surface of the container to provide a passage for air to flow from inside the container to outside the container via the groove portion.

20. The smoker of claim 19, wherein the groove portion is configured to extend from an outer periphery of the second end portion to a position spaced from the through bore.

21. The smoker of claim 19, wherein the groove portion includes two grooves in the surface of the second end portion, and
wherein the two grooves extend in a second direction perpendicular to the first direction of the through bore from an outer periphery of the second end portion.

22. The smoker of claim 21, wherein at least one of the two grooves is configured to extend from an outer periphery of the second end portion to a position spaced from the through bore.

23. The smoker of claim 18, wherein the first bore has an inside diameter that is greater than an inside diameter of the second bore.

24. The smoker of claim 23, wherein an interface of the first bore and the second bore defines a shoulder configured to retain the insert in the first bore.

25. The smoker of claim 23, wherein the inside diameter of the second bore is smaller than an outside diameter of the insert such that the second bore is configured to prevent the insert from passing into the second bore.

26. The smoker of claim 18, wherein the body member is a single monolithic piece of unitary construction.

27. The smoker of claim 18, wherein the body member includes a base portion and a top portion configured to be removably coupled with one another.

28. The smoker of claim 18, further comprising a lid configured to be placed on a surface of the first end of the body member to cover the first bore so as to block the flow of air from the container via the first bore.

* * * * *